United States Patent
Kishiyama et al.

(10) Patent No.: US 9,232,447 B2
(45) Date of Patent: Jan. 5, 2016

(54) RADIO BASE STATION APPARATUS AND MOBILE TERMINAL

(71) Applicant: NTT DOCOMO, INC., Tokyo (JP)

(72) Inventors: Yoshihisa Kishiyama, Kanagawa (JP); Motohiro Tanno, Kanagawa (JP); Mamoru Sawahashi, Kanagawa (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/480,933

(22) Filed: Sep. 9, 2014

(65) Prior Publication Data

US 2014/0378139 A1    Dec. 25, 2014

Related U.S. Application Data

(63) Continuation of application No. 13/058,468, filed as application No. PCT/JP2009/063321 on Jul. 27, 2009, now abandoned.

(30) Foreign Application Priority Data

Aug. 11, 2008    (JP) .................................. 2008-207505

(51) Int. Cl.
*H04W 36/00*    (2009.01)
*H04B 7/02*    (2006.01)
(Continued)

(52) U.S. Cl.
CPC ........... *H04W 36/0061* (2013.01); *H04B 7/022* (2013.01); *H04W 36/24* (2013.01); *H04W 72/042* (2013.01)

(58) Field of Classification Search
CPC   H04L 41/0681; H04L 41/0806; H04B 7/022; H04W 36/0061; H04W 36/24; H04W 36/30; H04W 72/042
USPC ........................................................... 455/436
See application file for complete search history.

(56) References Cited

U.S. PATENT DOCUMENTS

| | | |
|---|---|---|
| 6,701,150 B1 | 3/2004 | Huang et al. |
| 2002/0136193 A1 | 9/2002 | Chang et al. |

(Continued)

FOREIGN PATENT DOCUMENTS

| | | |
|---|---|---|
| EP | 1 883 264 A1 | 1/2008 |
| JP | 07-212816 A | 8/1995 |

(Continued)

OTHER PUBLICATIONS

Abstract of JP07-212816A, Published on Aug. 11, 1995, data supplied from the espacenet database—Worldwide, 1 page.

(Continued)

*Primary Examiner* — Kwasi Karikari
(74) *Attorney, Agent, or Firm* — Osha Liang LLP (57) ABSTRACT

To provide a radio base station apparatus and mobile terminal for enabling cell selection to be performed in a faster cell switching period in handover, the radio base station apparatus of the invention has a plurality of transmission/reception sections capable of being extended to remote sites, an FCS application determining section that determines whether to apply fast cell selection in handover based on information from the mobile terminal, and a multi-cell scheduling control section that controls transmission/non-transmission of the first and second transmission/reception sections when the FCS application determining section determines that FCS is applied.

12 Claims, 8 Drawing Sheets

(51) Int. Cl.
*H04W 36/24* (2009.01)
*H04W 72/04* (2009.01)

(56) References Cited

U.S. PATENT DOCUMENTS

| | | | | |
|---|---|---|---|---|
| 2003/0083069 | A1* | 5/2003 | Vadgama | 455/436 |
| 2003/0171118 | A1* | 9/2003 | Miya | 455/442 |
| 2006/0013185 | A1* | 1/2006 | Seo et al. | 370/343 |
| 2007/0049324 | A1* | 3/2007 | Sambhwani et al. | 455/525 |
| 2007/0109986 | A1* | 5/2007 | Kwak et al. | 370/316 |
| 2008/0014943 | A1 | 1/2008 | Ahn et al. | |
| 2008/0130582 | A1* | 6/2008 | Lee et al. | 370/332 |
| 2008/0268844 | A1 | 10/2008 | Ma et al. | |
| 2010/0105377 | A1 | 4/2010 | Iwamura et al. | |

FOREIGN PATENT DOCUMENTS

| | | |
|---|---|---|
| JP | 2008-034894 A | 2/2008 |
| JP | 2008-172380 A | 7/2008 |

OTHER PUBLICATIONS

3GPP TR 25.912 V7.1.0, "Feasibility study for evolved Universal Terrestrial Radio Access (UTRA) and Universal Terrestrial Radio Access Network (UTRAN)," Sep. 2006, 57 pages.
International Search Report issued in PCT/JP2009/063321, mailed on Aug. 25, 2009, 1 page.
Notification of Reasons for Rejection for Japanese Patent Application No. 2008-207505 mailed Jun. 19, 2012, with English translation thereof (5 pages).
3GPP TSG RAN WG1 Meeting #53bis, R1-082575, "Proposals for LTE-Advanced Technologies," NTT DoCoMo, Inc., Warsaw, Poland, Jun. 30-Jul. 4, 2008 (36 pages).
Ericsson, TSG-RAN WG1 #53, R1-082024, "A Discussion on Some Technology Components for LTE-Advanced," Kansas City, MO, May 5-9, 2008 (11 pages).
TSG-RAN Working Group 1 Meeting #18, TSGR1-#18(01)0033, "Power Control for Fast Cell Selection HSDPA," Samsung Electronics Co., Ltd., Boston, MA, Jan. 15-18, 2001 (3 pages).

* cited by examiner

(a)
| PDCCH OF NORMAL TIME (USER ID, RADIO RESOURCE ALLOCATION INFORMATION, ETC.) | CELL IDENTIFIER |

(b)
| PDCCH OF NORMAL TIME (USER ID, RADIO RESOURCE ALLOCATION INFORMATION, ETC.) | CELL IDENTIFIER | TRANSMISSION POWER INFORMATION |

(c)
| PDCCH OF NORMAL TIME (USER ID, RADIO RESOURCE ALLOCATION INFORMATION, ETC.) | CELL IDENTIFIER | PRESENCE OR ABSENCE OF INDIVIDUAL RS |

RADIO BASE STATION APPARATUS AND MOBILE TERMINAL

CROSS-REFERENCE TO RELATED APPLICATIONS

The present application is a continuation application of and, thereby, claims benefit under 35 U.S.C. §120 to U.S. patent application Ser. No. 13/058,468 filed on Feb. 10, 2011, titled, "RADIO BASE STATION APPARATUS AND MOBILE TERMINAL," which is a national stage application of PCT Application No. PCT/JP2009/063321, filed on Jul. 27, 2009, which claims priority to Japanese Patent Application No. 2008-0207505 filed on Aug. 11, 2008. The contents of the priority applications are incorporated by reference in their entirety.

TECHNICAL FIELD

The present invention relates to a radio base station apparatus and mobile terminal in the next-generation mobile communication system.

BACKGROUND ART

Generally, in cellular mobile communications, when a mobile terminal moves from a cell to another cell, the mobile terminal performs handover for switching between radio base station apparatuses as a communicating party. With respect to the handover function in the data link layer and lower layers, required QoS (Quality of Service) in the data link layer and lower layers is guaranteed by macro diversity between cells. In handover between cells, when high-speed packet scheduling and ARQ (Automatic Repeat Request) is considered, it is desired that the cell switching period is 100 ms.

Meanwhile, in UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been considered (Non-patent Document 1). Further, in the UMTS network, for the purpose of further increasing the wide-band and high speed, next-generation systems to LTE have been considered (for example, LTE Advancement (LTE-A), IMT Advance (IMT-A)).

CITATION LIST

Non-Patent Literature

Non-patent Literature 1
3GPP, TR25. 912 (V7.1.0), "Feasibility study for Evolved UTRA and UTRAN", September 2006

SUMMARY OF THE INVENTION

Technical Problem

In the next-generation mobile communication systems as described above, it is required to achieve a faster cell switching period in macro diversity in handover, however, under present circumstances, there is no method for enabling cell selection in a faster cell switching period to be achieved.

The present invention was made in view of the respect, and it is an object of the invention to provide a radio base station apparatus and mobile terminal for enabling cell selection to be performed in a faster cell switching period in handover.

Solution to Problem

A radio base station apparatus of the invention is characterized by having a transmission/reception section configured to have a plurality of transmission/reception elements capable of being extended from a main apparatus to remote sites, a fast cell selection determining section configured to determine whether to apply fast cell selection in handover of a mobile terminal based on information from the mobile terminal, and a control section configured to control transmission/non-transmission for each of the plurality of transmission/reception sections when the fast cell selection determining section determines that fast cell selection is applied.

Technical Advantage of the Invention

In the invention, the radio base station apparatus determines whether to apply fast cell selection in handover based on information from the mobile terminal, and controls transmission/non-transmission of at least one of the transmission/reception elements. For this control of transmission/non-transmission, it is possible to collectively control the transmission/reception elements extended to remote sites and the transmission/reception element provided in the main apparatus, and it is thereby possible to perform cell selection in a faster cell switching period in macro diversity in handover.

BRIEF DESCRIPTION OF DRAWINGS

FIGS. 3(*a*) to 3(*c*) are diagrams illustrating formats of downlink control information;

FIGS. 5(*a*) to 5(*c*) are diagrams illustrating formats for feedback of communication environment information to the radio base station apparatus;

FIGS. 6(*a*) and 6(*b*) are diagrams illustrating application of FCS of control channel and data channel;

DESCRIPTION OF EMBODIMENTS

Embodiments of the invention will specifically be described below with reference to accompanying drawings.

Embodiment 1

Figure 1:
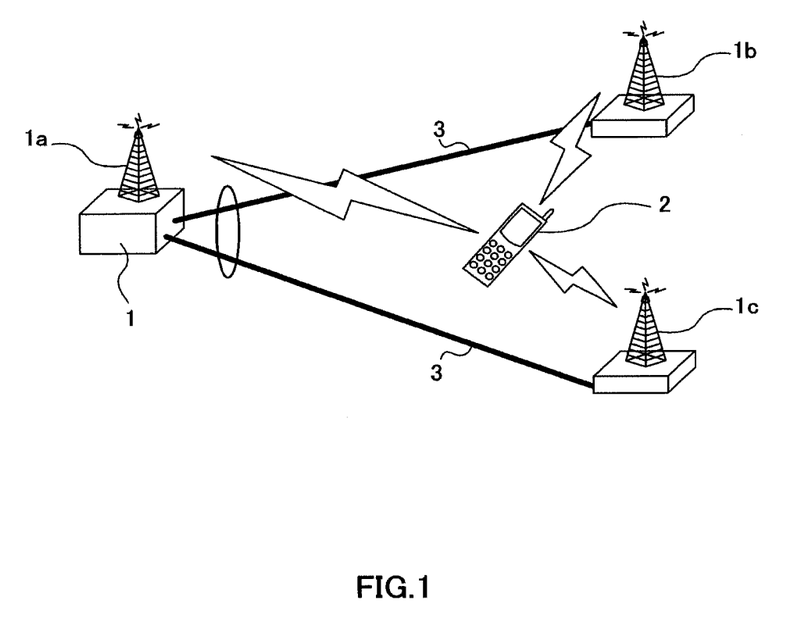
FIG. 1 is a diagram illustrating a radio base station apparatus and mobile terminal according to Embodiment 1 of the invention.

FIG. 1 is a diagram illustrating a radio base station apparatus and mobile terminal according to the Embodiment of the invention. In a radio communication system comprised of the radio base station apparatus and mobile terminal, as a multiplexing scheme, OFDMA (Orthogonal Frequency Division Multiple Access) is used in downlink, while SC-FDMA (Single Carrier Frequency Division Multiple Access) is used in uplink.

The radio base station apparatus according to the invention has the configuration as shown in FIG. 1. The radio base station apparatus has a transmission/reception element 1a provided in the main apparatus 1, and at least one of transmission/reception elements 1b, 1c extended to remote sites by optical fibers 3. The radio base station apparatus has all of processing sections (baseband processing section, call control processing section, etc.) for the cell of the transmission/reception element 1a, processing sections (baseband processing section, call control processing section, etc.) for the cell of the transmission/reception element 1b and of processing sections (baseband processing section, call control processing section, etc.) for the cell of the transmission/reception element 1c provided in the main apparatus 1, and is further provided with a multi-cell scheduling control section, described later, for collectively performing scheduling to perform transmission/non-transmission for respective cells of the transmission/reception elements 1a, 1b, 1c and a FCS (Fast Cell Selection) determining section, described later, for determining whether to apply fast cell selection. Further, the transmission/reception elements 1b, 1c are extended to remote sites by the optical fibers 3.

In the configuration as shown in FIG. 1 i.e. the configuration in which the main apparatus 1 has at least one of transmission/reception elements 1b, 1c extended to remote sites by optical fibers 3, the processing sections of each of the transmission/reception elements 1b, 1c are provided in the main apparatus 1, and the multi-cell scheduling control section and the FCS determining section are collected in the main apparatus 1, since processing sections for downlink to adjacent cells are collected in the main apparatus 1, it is possible to collectively perform scheduling of transmission signals for downlink to each of the adjacent cells. Further, The main apparatus 1 may collect, via the optical fibers 3, the communication environment information (communication environment information, etc.) between each of the transmission/reception sections 1a, 1b, 1c and the mobile terminal 2 using an uplink signal received in each of the transmission/reception sections 1a, 1b, 1c. Therefore, it is possible to determine whether to apply FCS based on above information. It is possible to make such an FCS application determination and scheduling of downlink signals to each cell, and it is thereby possible to perform faster cell selection. In addition, it is not always necessary to extend the transmission/reception elements 1b, 1c to remote sites, and it is also possible to provide a plurality of transmission/reception elements inside the main apparatus 1. Alternately, it is possible to provide a configuration that the transmission/reception element 1a is not provided inside the apparatus 1. Further, it is possible to use cables connecting between the main apparatus 1 and the extended transmission/reception elements 1b, 1c except optical cables.

In the configuration, in handover between cells, it is determined whether it is necessary to apply FCS i.e. the mobile terminal 2 exits at the cell edge, based on the communication environment information from the mobile terminal 2. When the mobile terminal 2 exits at the cell edge, it is necessary to apply FCS, FCS is applied (FCS mode). In the FCS mode, the radio base station apparatus transmits downlink signals from the cell (transmission/reception element) with the best communication environment among the adjacent cells, while halting transmission from the other cells (transmission/reception elements).

The determination (cell edge identification) whether it is necessary to apply FCS i.e. whether the mobile terminal 2 exists at the cell edge is preferably made, for example, using identification information (cell ID) of the adjacent cell, reference signal received power (RSRP) of the cell, etc. In this case, the RSRP of adjacent cells (for example, handover source and handover target) is obtained, and compared with each other, and the determination is made by determining whether the difference is in a predetermined range. This is because when the difference in RSRP between the cells is in a predetermined range, it is considered that the mobile terminal 2 is not close to one of the transmission/reception elements, and is located at some distance from both of the transmission/reception elements i.e. exists at the cell edge.

Figure 2:
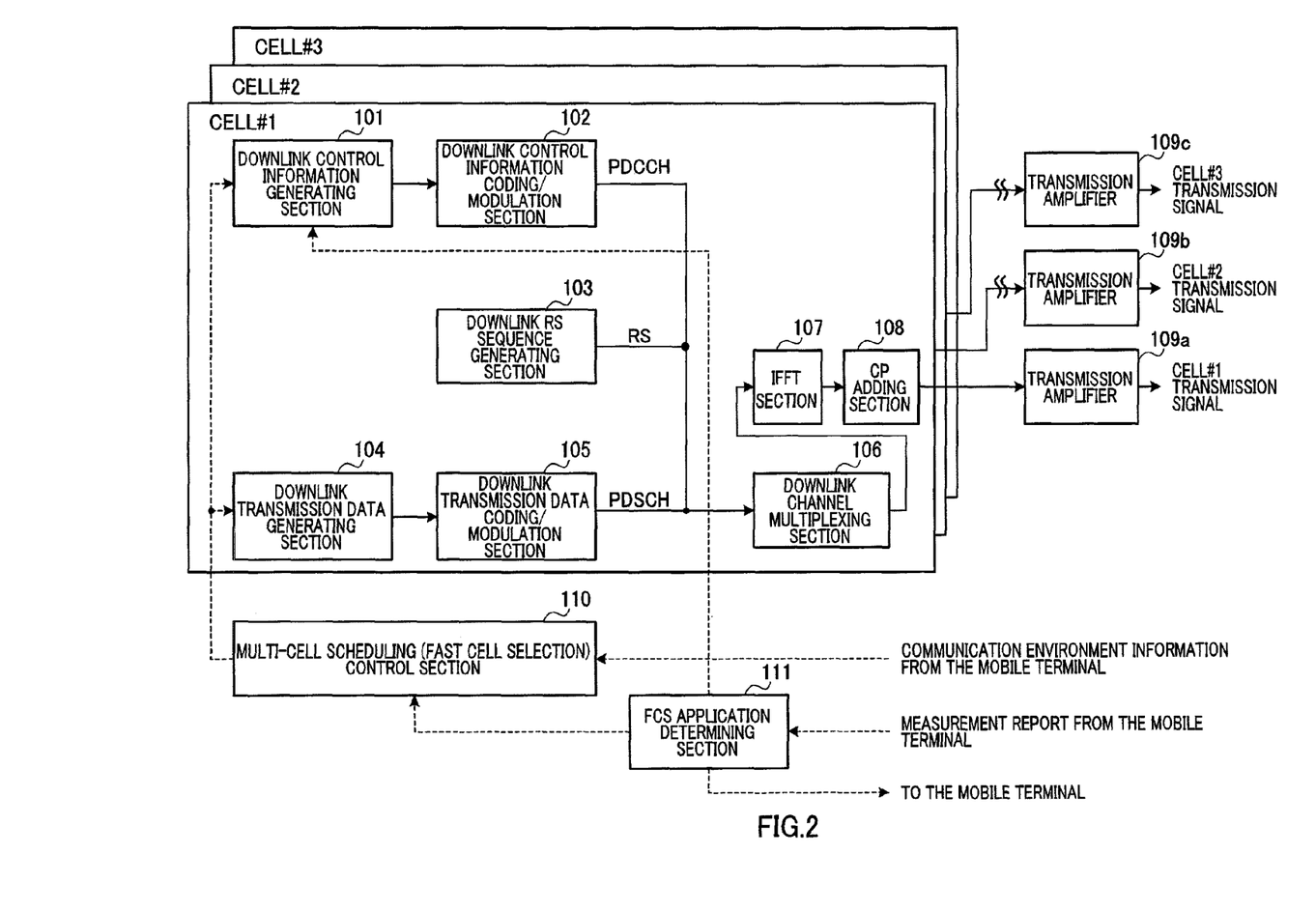
FIG. 2 is a diagram illustrating a schematic configuration of the radio base station apparatus according to Embodiment 1 of the invention.

FIG. 2 is a diagram illustrating the configuration of the radio base station apparatus according to the Embodiment of the invention. The radio base station apparatus as shown in FIG. 2 is an apparatus for generating only a cell specific reference signal. The radio base station apparatus as shown in FIG. 2 is principally comprised of processing sections (cell #1 processing section, cell #2 processing section and cell #3 processing section) of a plurality of adjacent cells (herein, three cells), transmission amplifiers 109a, 109b, 109c respectively for cell #1, cell #2 and cell #3, an FCS determining section 111 that determines whether to apply FCS, and a multi-cell scheduling control section 110 that collectively performs transmission/non-transmission to each of the cell #1, cell #2 and cell #3. The transmission amplifiers 109a, 109b, 109c are included in the above-mentioned transmission/reception elements (transmission/reception sections 1a, 1b, 1c in FIG. 1), and are used to transmit cell #1 transmission signal, cell #2 transmission signal, and cell #3 transmission signal, respectively. Further, transmission amplifiers 109b, 109c are installed in the transmission reception elements that are extended using optical fibers and that are located at remote sites as shown in FIG. 1. In addition, the processing sections of the cells include respective processing section of reception-systems (not shown).

Each of the processing sections is principally comprised of a downlink control information generating section 101 that generates control information (control signal) to transmit to a mobile terminal, a downlink control information coding/modulation section 102 that performs coding and modulation on the downlink control signal, a downlink RS sequence generating section 103 that generates a reference signal (RS) sequence (cell specific reference signal sequence) used for channel estimation in the mobile terminal, a downlink transmission data generating section 104 that generates data to transmit to the mobile terminal, a downlink transmission data coding/modulation section 105 that performs coding and modulation on the downlink transmission data, a downlink channel multiplexing section 106 that multiplexes the coded modulated downlink control signal and downlink data and the downlink RS sequence, an IFFT (Inverse Fast Fourier Transform) section 107 that performs IFFT computing on the channel multiplexed signal, and a CP adding section 108 that adds CP (Cyclic Prefix) to the IFFT-computed signal. In FIG. 2, each processing block as mentioned above is described in the processing section of cell #1, and the each processing block as mentioned above is similarly included in the processing section of cell #2 and the processing section of cell #3.

The FCS application determining section 111 is notified, from the mobile terminal, of information (for example, information of whether the mobile terminal exists at the cell edge (for example, whether the difference of RSRP is in the predetermined range)) required for FCS application determination which is obtained from the received signal in the mobile terminal. This notification is made using signaling in the upper layer, for example. The FCS application determining section 111 outputs the FCS application information (determination result) determined in the section 111 i.e. information of whether to apply FCS and when required, a target cell of FCS, to the downlink control information generating section 101 and downlink transmission data generating section 104 in the processing section of each cell, and the multi-cell scheduling control section 110. In other words, when the FCS application determining section 111 is notified of the information required for the FCS application determination, the section 111 makes the determination whether to apply FCS (determines application of FCS when the mobile terminal exists at the cell edge), and outputs the information indicative of application of FCS to the downlink control information generating section 101 of each cell, while further outputting the information to the multi-cell scheduling control section 110 to perform fast cell selection.

The FCS application information may be notified to the mobile terminal. By notifying the mobile terminal of the FCS application information, the mobile terminal is capable of acquiring all of the communication environment information of the adjacent cells, identifying a cell with the best communication environment, or obtaining the relative relationship of the communication environment between cells, and notifying the radio base station apparatus of the communication environment information, cell information and/or the relative relationship of the communication environment as feedback. The notification of the FCS application information may be performed using signaling in the upper layer, or may be transmitted to the mobile terminal using a dedicated control channel.

Further, by notifying the mobile terminal of the FCS application information, the mobile terminal is capable of performing channel estimation using the cell specific reference signal (common reference signal) in addition to the terminal specific reference signal (dedicated reference signal). In other words, the mobile terminal is capable of recognizing a change in the cell to transmit from the FCS application information, and therefore, is capable of performing channel estimation for each cell using the cell specific reference signal based on a format for each cell. Thus, by performing channel estimation using the cell specific reference signal in addition to channel estimation of the terminal specific reference signal, it is possible to perform channel estimation with high accuracy, and accuracy increases in the communication environment information required for the FCS application determination.

In addition, when the FCS application information is not notified to the mobile terminal, the mobile terminal notifies the radio base station apparatus of the communication environment information based on channel estimation using the terminal specific reference signal as feedback, and the radio base station apparatus makes the FCS application determination based on the communication environment information based on the single cell.

As described above, the FCS application information is output from the FCS application determining section 111 to the downlink control information generating section 101. At the normal time (except the time of FCS application), the downlink control information includes the user ID (terminal identification information), radio resource allocation information, etc. When the mobile terminal receives the downlink control information, the mobile terminal checks the user ID, and only the mobile terminal corresponding to the user ID is capable of decoding the radio resource allocation information (blind decoding).

Figure 3:
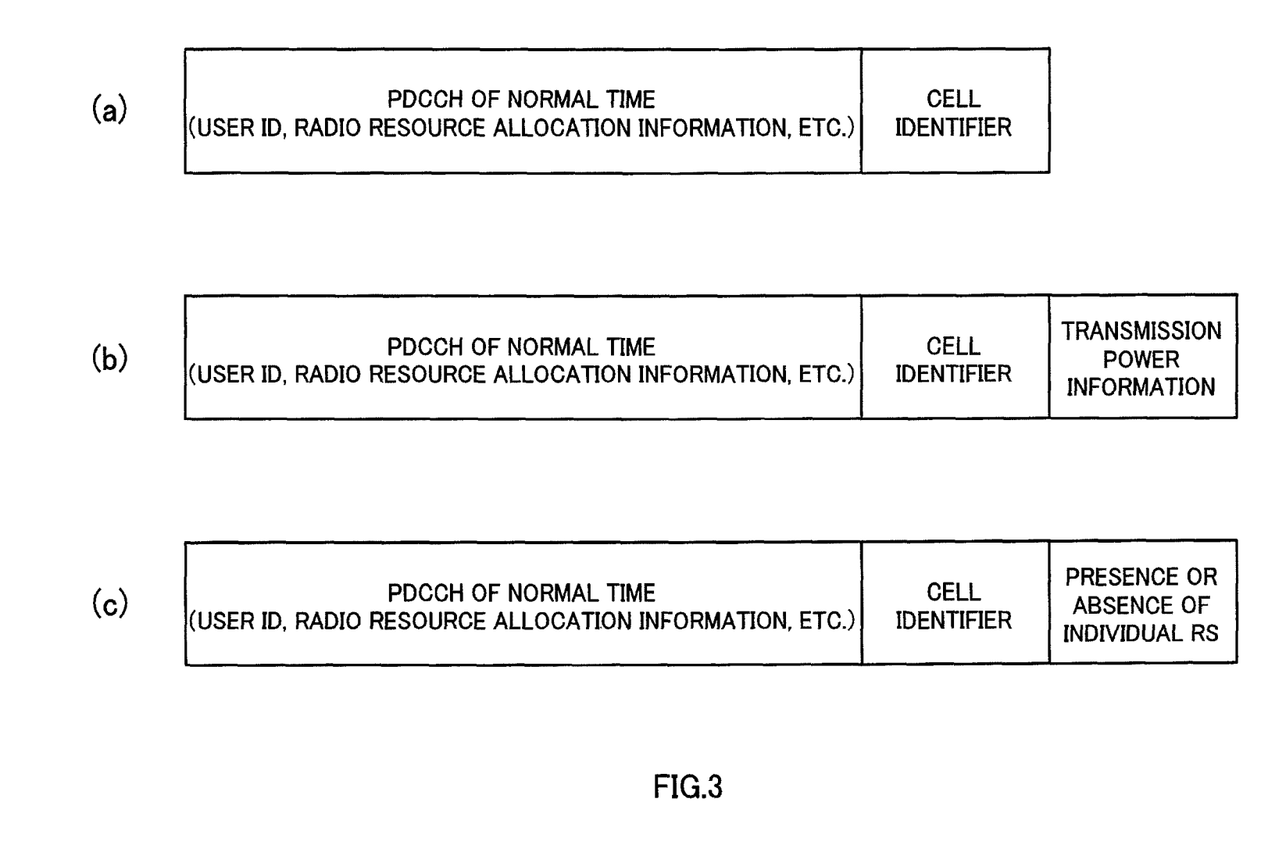

At the time of applying FCS, the FCS information is output to the downlink control information generating section 101. The downlink control information generating section 101 adds the cell identification (cell identifier), which corresponds to the transmission/reception element that performs transmission, to the downlink control information. For example, the downlink control information generating section 101 may generate a control signal including the identification information of the cell that performs transmission when FCS is applied. In other words, the section 101 may generate a downlink control signal using the format as shown in FIG. 3(a). The mobile terminal receiving such downlink control information is capable of decoding the cell identification information by blind decoding, and is thereby capable of identifying the cell to perform transmission. Therefore, the mobile terminal is capable of recognizing the cell of the cell specific reference signal (the cell of the format), and thereby performing channel estimation using the cell specific reference signal.

Further, the downlink control information generating section 101 may generate a control signal including transmission power information. In other words, as shown in FIG. 3(b), by thus adding the transmission power information, the mobile terminal is capable of being notified of the transmission power in FCS application, and it is thereby possible to transmit signals with the higher transmission power at the FCS application time than at the normal time. Furthermore, the downlink control information generating section 101 may generate a control signal including information of the presence or absence of the terminal specific reference signal. In other words, as shown in FIG. 3(c), the section 101 may add the information of the presence or absence of the terminal specific reference signal as well as the cell identification information. By thus adding the information of the presence or absence of the terminal specific reference signal, it is possible to notify the mobile terminal of use of the terminal specific reference signal, and the mobile terminal is thereby capable of performing channel estimation also using the terminal specific reference signal that is additionally used.

Upon receiving the FCS application information from the FCS application determining section 111, the multi-cell scheduling (fast cell selection) control section 110 performs scheduling for multiple cells for performing transmission to the mobile terminal via the transmission/reception element (cell) with the best communication environment, while not performing transmission to the mobile terminal via the other transmission/reception elements (cells). In other words, in the FCS mode, the multi-cell scheduling control section 110 specifies a cell with the best communication environment based on the communication environment information (for example, CQI (Channel Quality Indicator) of the adjacent cells and PMI) transmitted from the mobile terminal, and instructs the downlink signal generating sections 101, 104 of the processing section of the cell to generate the signal (multi-cell scheduling). By this means, transmission is performed only from the transmission/reception element of the cell with the best communication environment, and transmission is halted from the transmission/reception elements of the other cells. The multi-cell scheduling control section 110 collectively performs scheduling corresponding to a plurality of cells including control of the transmission cell and non-transmission cells.

Figure 4:
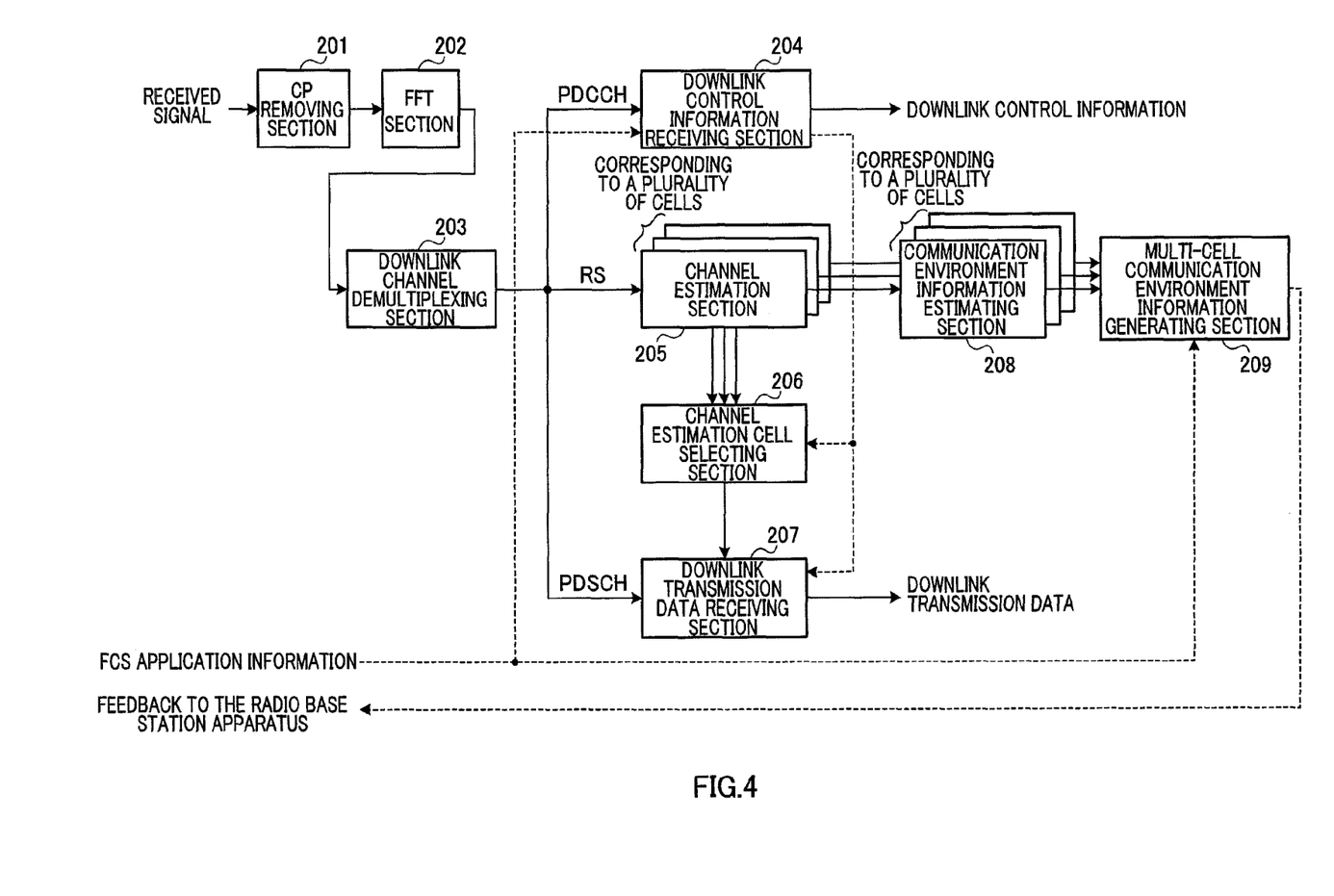
FIG. 4 is a diagram illustrating a schematic configuration of the mobile terminal according to Embodiment 1 of the invention.

FIG. 4 is a diagram illustrating the configuration of the mobile terminal that performs radio communications with the radio base station apparatus as shown in FIG. 2. The mobile terminal as shown in FIG. 4 is principally comprised of a CP removing section 201 that removes CP from a signal transmitted from the radio base station apparatus, an FFT section 202 that performs FFT computing on the received signal, a downlink channel demultiplexing section 203 that demultiplexes the FFT-computed signal into control information, reference signal and data, a downlink control information receiving section 204 that performs predetermined reception processing on the demultiplexed downlink control information, a channel estimation sections 205 that performs channel estimation using the demultiplexed reference signal, a channel estimation cell selecting section 206 that selects a transmission cell to perform the reception processing based on the channel estimation result, a downlink transmission data receiving section 207 that performs predetermined reception processing on the demultiplexed downlink transmission data, a communication environment information estimating sections 208 that estimate the communication environment (CQI and PMI) based on the channel estimation result, and a multi-cell communication environment information generating section 209 that generates the communication environment information from the communication environment information of each cell. The channel estimation sections 205 and the communication environment information estimating sections 208 are provided corresponding to cells.

In the mobile terminal with such a configuration, when the FCS application information is notified from the radio base station apparatus, the FCS application information is output to the downlink control information receiving section 204 and the multi-cell communication environment information generating section 209.

Upon receiving the FCS application information, the multi-cell communication environment information generating section 209 generates the status of communication environments of adjacent cells (multi-cell communication environment information) using the communication environment information (for example, CQI and PMI) of the adjacent cells to report the radio base station apparatus (feedback to the radio base station apparatus). By this means, the radio base station apparatus is capable of recognizing which cell is with the best communication environment among the adjacent cells.

Figure 5:
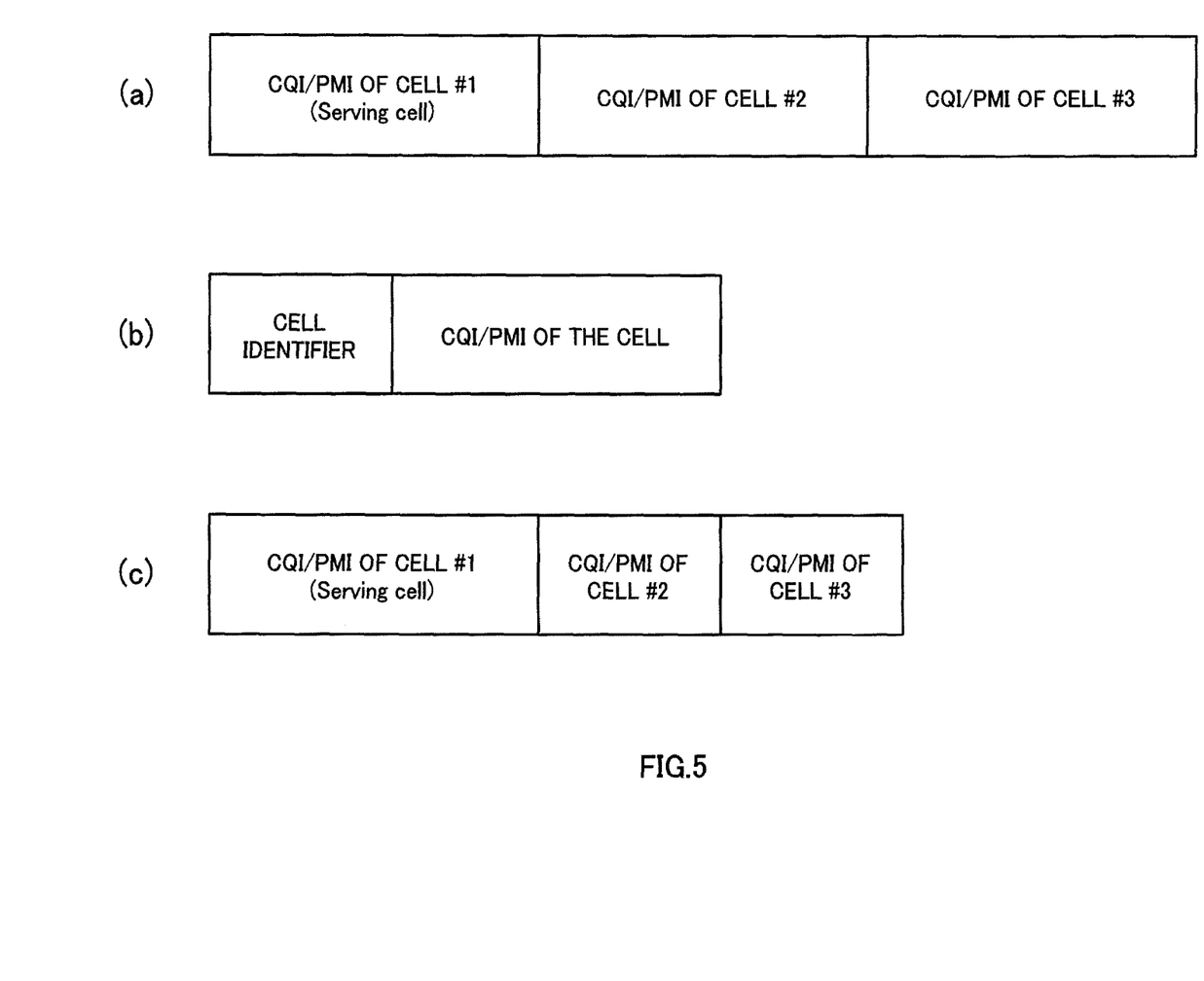

When the mobile terminal notifies the radio base station apparatus of the communication environment information as feedback, there are various methods. For example, by including the communication environment information concerning each cell as the communication environment information concerning the adjacent cells i.e. using the format as shown in FIG. 5(a), the mobile terminal reports all the communication environment information of the adjacent cells. Alternately, by including the identification information of the cell with the best communication conditions, and the communication environment information of the cell with the best communication conditions as the communication environment information concerning the adjacent cells i.e. using the format as shown in FIG. 5(b), the mobile terminal compares the communication environment information of the cells with one another, specifies the best cell, and reports the identification information of the cell and the communication environment information of the cell. Otherwise, by including the communication environment information on a particular cell, and a relative value of the communication environment information of the other adjacent cells to the communication environment information of the particular cell as the communication environment information concerning the adjacent cells i.e. using the format as shown in FIG. 5(c), the mobile terminal reports the communication environment information of the particular cell (for example, the source cell of handover) and the relative value to the communication environment information.

The downlink control information receiving section 204 performs the predetermined reception processing e.g. blind decoding on the downlink control information. By this means, the section 204 is capable of recognizing that the information is data to the mobile terminal. When the section 204 recognizes that the information is the data to the mobile terminal, the information is output to the downlink transmission data receiving section 207, and the downlink transmission data receiving section 207 performs the predetermined reception processing, e.g. demodulation and decoding, on the downlink transmission data.

Figure 6:
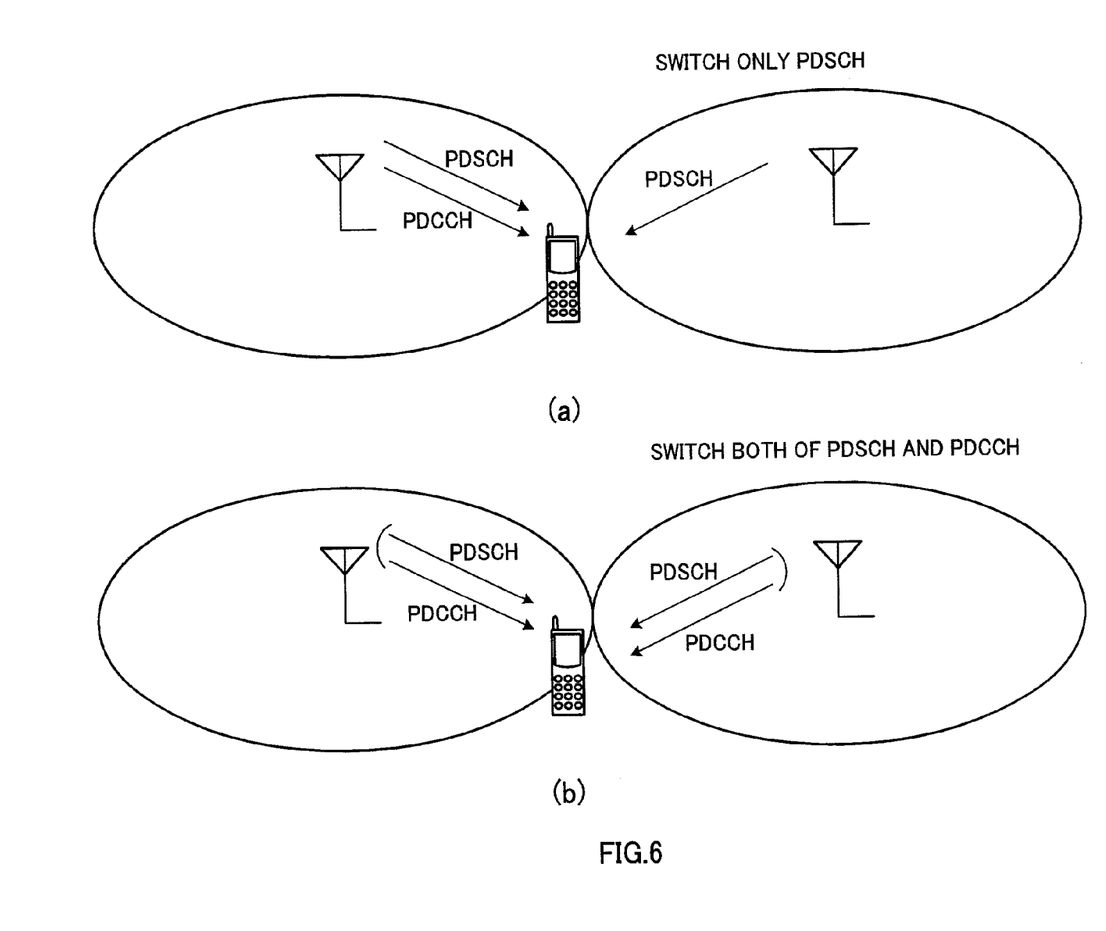

When the downlink control information receiving section 204 is notified of the FCS application information, the reception format for FCS is varied to perform reception or the number of cells to perform reception is increased. For example, when FCS is applied, considered are the case of performing FCS only on the data channel (PDSCH) as shown in FIG. 6(a), and the case of performing FCS on both of the data channel (PDSCH) and the control channel (PDCCH) as shown in FIG. 6(b). In the case as shown in FIG. 6(b), the data channel and the control channels are transmitted from the same cell, and the cell to perform reception is a single cell. In the case as shown in FIG. 6(a), the data channel and the control channel may be transmitted from different cells. In the case, it is necessary to receive signals from two cells, and the downlink control information receiving section 204 increases the number of cells to perform reception.

Described next is the case of applying FCS in the radio base station apparatus as shown in FIG. 2 and the mobile terminal as shown in FIG. 4. Herein, described is the case of performing channel estimation using only the cell specific reference signal.

First, the mobile terminal notifies the information (for example, whether the difference of RARP is in the predetermined range) required for FCS application determination obtained from the received signal in the mobile terminal. This notification is made using signaling in the upper layer, for example. Upon receiving the information required for the FCS application determination, the FCS application determining section 111 in the radio base station apparatus determines whether to apply FCS. When the FCS application determining section 111 determines that FCS is applied, the FCS application information is output to the downlink control information generating section 101 of the processing section of each cell and the multi-cell scheduling control section 110.

The communication environment information (CQI and PMI) is transmitted from the mobile terminal to the multi-cell scheduling control section 110. The multi-cell scheduling control section 110 selects a cell with the best communication environment based on the communication environment information, and performs scheduling. In this case, the mobile terminal transmits the communication environment information using the format as shown in FIGS. 5(a) to 5(c). The scheduling information is output to the downlink control information generating section 101 and downlink transmission data generating section 104 of the processing section of the cell (the scheduled cell) with the best communication environment. Then, the downlink control information generating section 101 and downlink transmission data generating section 104 of the cell with the best communication environment generate the control information and transmission data based on the scheduling information, and the generated control information and transmission data is transmitted through the corresponding transmission amplifier. For example, when the cell with the best communication environment is cell #2, the downlink control information generating section 101 and downlink transmission data generating section 104 of cell #2 generate the control information and transmission data, and the control information and transmission data is transmitted from the transmission amplifier 109b installed at the remote site via the optical fiber.

The mobile terminal receives the FCS application information from the radio base station apparatus to output to the downlink control information receiving section 204 and multi-cell communication environment information generating section 209. Further, in the mobile terminal, the downlink control information receiving section 204 performs blind decoding, and identifies whether the information is the control information to the mobile terminal. The identification information is output to the downlink transmission data receiving section 207. Meanwhile, the mobile terminal performs channel estimation in the channel estimation section 205, using the cell specific reference signal included in the downlink signal from the radio base station apparatus. The obtained channel estimation value is used in the reception processing in the downlink transmission data receiving section 207. Thus, the downlink transmission data is obtained.

In addition, as shown in FIG. 6(a), when the data channel and the control channel are transmitted from different cells, since the downlink control information receiving section 204 increases the number of cells to perform reception, the number of cells to perform channel estimation increases. Therefore, the identification information obtained in the downlink control information receiving section 204 is output to the channel estimation cell selecting section 206. Then, using the identification information, the channel estimation cell selecting section 206 selects a channel estimation value for use in the reception processing of the downlink transmission data from a plurality of channel estimation values from the channel estimation sections 205.

The channel estimation value for each cell obtained in the channel estimation section 205 is output to the communication environment information estimating section 208, and the communication environment is estimated for each cell. Then, the communication environment information for each cell is output to the multi-cell communication environment information generating section 209. The multi-cell communication environment information generating section 209 generates the communication environment information to transmit to the radio base station apparatus as feedback from the communication environment information for each cell. For example, using the format as shown in FIGS. 3(a) to 3(c), the communication environment information is transmitted to the radio base station apparatus as feedback. Then, the multi-cell scheduling control section 110 in the radio base station apparatus selects the cell with the best communication environment based on the communication environment information to perform scheduling.

Thus, in the system of this Embodiment, the radio base station apparatus determines whether to apply FCS in handover based on the information from the mobile terminal, and when determining that FCS is applied, controls transmission/non-transmission in at least one of transmission/reception elements extended to the remote sites by optical fibers and the transmission/reception element provided in the main apparatus. The control of transmission/non-transmission is collectively performed on the transmission/reception elements extended to the remote sites by optical fibers and transmission/reception element provided in the main apparatus, and it is thereby possible to perform cell selection in the faster cell switching period in macro diversity in handover.

Embodiment 2

Figure 7:
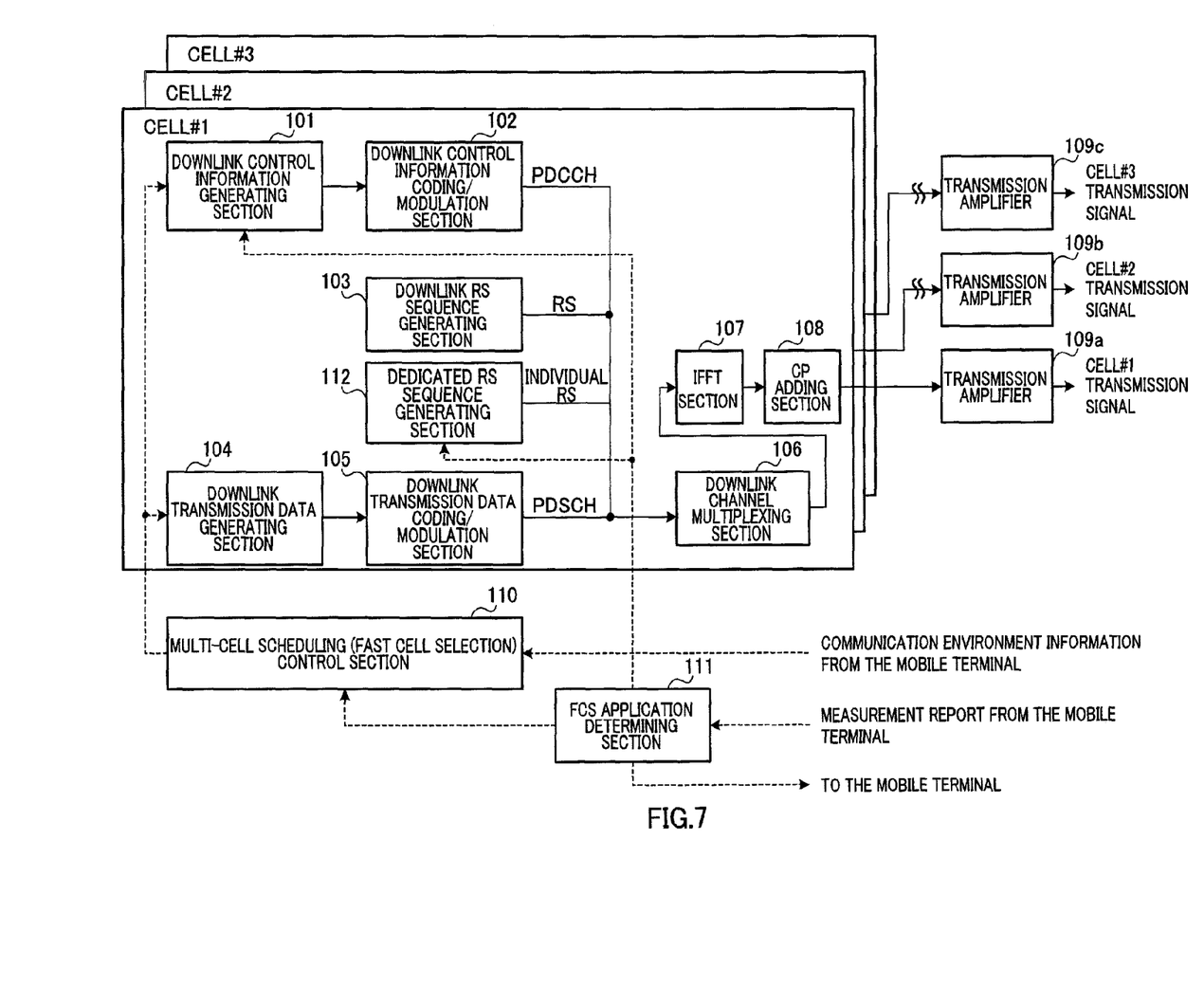
FIG. 7 is a diagram illustrating a schematic configuration of a radio base station apparatus according to Embodiment 2 of the invention.

This Embodiment describes the case of performing channel estimation using a terminal specific reference signal in addition to the cell specific reference signal. FIG. 7 is a diagram illustrating a configuration of a radio base station apparatus according to Embodiment 2. In addition, in FIG. 7, the same parts as those in FIG. 2 are assigned the same reference numerals, and specific descriptions thereof are omitted. The radio base station apparatus as shown in FIG. 7 is provided with an dedicated RS sequence generating section 112 that generates a terminal specific reference signal (dedicated RS). The FCS application information is input to the dedicated RS sequence generating section 112 from the FCS application determining section 111, and the section 112 generates the dedicated RS, when the FCS application information is input to the section 112. The generated dedicated RS is output to a downlink channel multiplexing section 106 and multiplexed as a downlink signal.

Figure 8:
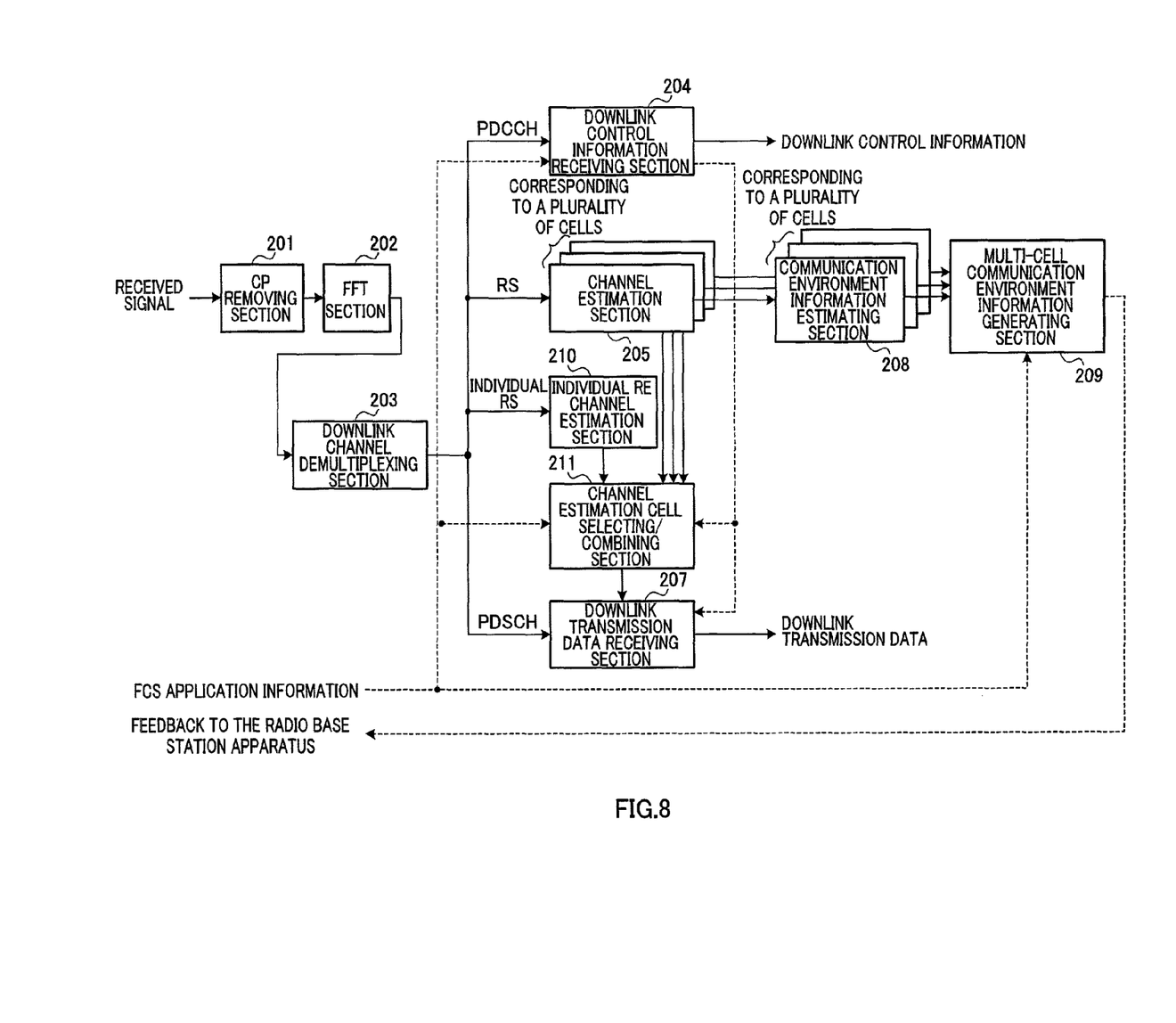
FIG. 8 is a diagram illustrating a schematic configuration of a mobile terminal according to Embodiment 2 of the invention.

FIG. 8 is a diagram illustrating a configuration of a mobile terminal according to Embodiment 2. In addition, in FIG. 8, the same parts as those in FIG. 4 are assigned the same reference numerals as in FIG. 4, and specific descriptions thereof are omitted. The mobile terminal as shown in FIG. 8 is provided with an dedicated RS channel estimation section 210 that performs channel estimation using the terminal specific reference signal (dedicated RS), and is further provided with a channel estimation cell selecting/combining section 211 that combines or selects the channel estimation value obtained by using the cell specific reference signal (common RS) and a channel estimation value obtained by using the dedicated RS, as a substitute for the channel estimation cell selecting section 206.

The FCS application information is input to the channel estimation cell selecting/combining section 211 from the FCS application determining section 111, and when the FCS application information is input thereto, the channel estimation cell selecting/combining section 211 selects using a channel estimation value based on the terminal specific reference signal or using a channel estimation value based on the cell specific reference signal, or combines the channel estimation value based on the terminal specific reference signal and the channel estimation value based on the cell specific reference signal.

Thus, by performing channel estimation using the terminal specific reference signal in addition to the cell specific reference signal, accuracy of the channel estimation value is increased, and it is possible to enhance the reception quality of downlink transmission data.

Described next is the case where FCS is applied in the radio base station apparatus as shown in FIG. 7 and the mobile terminal apparatus as shown in FIG. 8. Described herein is the case of performing channel estimation using the terminal specific reference signal in addition to the cell specific reference signal.

First, the mobile terminal notifies the information required for the FCS application determination (for example, information indicating whether the difference of RSRP is in the predetermined range) obtained from a received signal in the mobile terminal. This notification is made, for example, using signaling in the upper layer. Upon receiving the information required for the FCS application determination, the FCS application determining section 111 in the radio base station apparatus determines whether to apply FCS. When the FCS application determining 111 determines that FCS is applied, the FCS application information is output to the downlink control information generating section 101 and dedicated RS sequence generating section 112 of the processing section of each cell, and the multi-cell scheduling control section 110.

The communication environment information (CQI and MPI) is transmitted to the multi-cell scheduling control section 110 from the mobile terminal. The multi-cell scheduling control section 110 selects a cell with the best communication environment based on the communication environment information to perform scheduling. In this case, the mobile terminal transmits the communication environment information using the format as shown in FIGS. 5(a) to 5(c). The scheduling information is output to the downlink control information generating section 101 and downlink transmission data generating section 104 of the processing section of the cell (the scheduled cell) with the best communication environment. Then, the downlink control information generating section 101 and downlink transmission data generating section 104 of the cell with the best communication environment generate the control information and transmission data based on the scheduling information, and the generated control information and transmission data is transmitted through the corresponding transmission amplifier. For example, when the cell with the best communication environment is cell #2, the downlink control information generating section 101 and downlink transmission data generating section 104 of cell #2 generate the control information and transmission data, and the control information and transmission data is transmitted from the transmission amplifier 109b installed at the remote site via the optical fiber. In addition, when the FCS application information is output to the dedicated RS sequence generating section 112, the terminal specific reference signal is generated, and is multiplexed into the downlink signal.

The mobile terminal receives the FCS application information from the radio base station apparatus to output to the downlink control information receiving section 204 and multi-cell communication environment information generating section 209. Further, in the mobile terminal, the downlink control information receiving section 204 performs blind decoding, and identifies whether the information is the control information to the mobile terminal. The identification information is output to the downlink transmission data receiving section 207. Meanwhile, the mobile terminal performs channel estimation in the channel estimation section 205, using the cell specific reference signal included in the downlink signal from the radio base station apparatus. Further, the dedicated RS channel estimation section 210 performs channel estimation using the terminal specific reference signal. These channel estimation values are output to the channel estimation cell selecting/combining section 211. Then, the channel estimation cell selecting/combining section 211 selects or combines the channel estimation values. The channel estimation value is used in the reception processing in the downlink transmission data receiving section 207. Thus, the downlink transmission data is obtained.

In addition, as shown in FIG. 6(a), when the data channel and the control channel are transmitted from different cells, since the downlink control information receiving section 204 increases the number of cells to perform reception, the number of cells to perform channel estimation increases. Therefore, the identification information obtained in the downlink control information receiving section 204 is output to the channel estimation cell selecting/combining section 211. Then, using the identification information, the channel estimation cell selecting/combining section 211 selects a channel estimation value for use in the reception processing of the downlink transmission data from a plurality of channel estimation values from the channel estimation sections 205.

The channel estimation value for each cell obtained in the channel estimation section 205 is output to the communication environment information estimating section 208, and the communication environment is estimated for each cell. Then, the communication environment information for each cell is output to the multi-cell communication environment information generating section 209. The multi-cell communication environment information generating section 209 generates the communication environment information to transmit to the radio base station apparatus as feedback from the communication environment information for each cell. For example, using the format as shown in FIGS. 3(a) to 3(c), the communication environment information is transmitted to the radio base station apparatus as feedback. Then, the multi-cell scheduling control section 110 in the radio base station apparatus selects the cell with the best communication environment based on the communication environment information to perform scheduling.

Thus, also in the system of this Embodiment, the radio base station apparatus determines whether to apply FCS in handover based on the information from the mobile terminal, and when determining that FCS is applied, controls transmission/non-transmission in at least one of transmission/reception elements extended to the remote sites by optical fibers and the transmission/reception element provided in the main apparatus. The control of transmission/non-transmission is collectively performed on the transmission/reception elements extended to the remote sites by optical fibers and transmission/reception element provided in the main apparatus, and it is thereby possible to perform cell selection in the faster cell switching period in macro diversity in handover.

The present invention is not limited to the above-mentioned Embodiments, and is capable of being carried into practice with various modifications thereof as appropriate. For example, the number of cells, the numbers of processing sections, processing procedures and parameters indicating the communication environment in the above-mentioned descriptions are capable of being carried into practice with modifications thereof as appropriate without departing from the scope of the invention. Further, the invention is capable of being carried into practice with modifications thereof as appropriate without departing from the scope of the invention.

The invention claimed is:

1. A radio base station apparatus comprising:
   a transmission/reception section having a plurality of transmission/reception elements;
   a reference signal generating section configured to generate a first downlink reference signal to use in generating communication environment information by a mobile terminal;
   a downlink transmission generating section configured to generate downlink transmission data; and
   a downlink control information generating section configured to generate cell identification information for identifying a format of the first downlink reference signal in a Fast Cell Selection (FCS) mode;
   wherein in the FCS mode, a second downlink reference signal that is a terminal specific reference signal is transmitted with the downlink transmission data from one of the plurality of transmission/reception elements.

2. The radio base station apparatus according to claim 1, further comprising:
   a notification section configured to notify the mobile terminal of fast cell selection information in the FCS mode.

3. The radio base station apparatus according to claim 1, wherein the communication environment information includes multi-cell communication environment information.

4. A mobile terminal comprising:
a communication environment information generating section configured to generate communication environment information using a first downlink reference signal from a radio base station apparatus;
a downlink control information receiving section configured to, in a Fast Cell Selection (FCS) mode, receive cell identification information for identifying a format of the first downlink reference signal; and
a downlink transmission data receiving section configured to, in the FCS mode, receive downlink transmission data from the radio base station apparatus using a second downlink reference signal that is a terminal specific reference signal from the radio base station apparatus, based on the format of the first downlink reference signal identified by the cell identification information.

5. The mobile terminal according to claim 4, wherein the communication environment information includes multi-cell communication environment information and the multi-cell communication environment information is transmitted to the radio base station apparatus as feedback.

6. The mobile terminal according to claim 4, wherein the communication environment information includes identification information of a cell with the best communication conditions, and communication environment information of the cell with the best communication conditions.

7. The mobile terminal according to claim 4, wherein the communication environment information includes communication environment information concerning a particular cell, and a relative value of communication environment information of an other adjacent cell to the communication identification information of the particular cell.

8. The mobile terminal according to claim 4, wherein in the FCS mode, the mobile terminal receives fast cell selection information from the radio base station apparatus.

9. The mobile terminal according to claim 5, wherein in the FCS mode, the mobile terminal receives fast cell selection information from the radio base station apparatus.

10. The mobile terminal according to claim 6, wherein in the FCS mode, the mobile terminal receives fast cell selection information from the radio base station apparatus.

11. The mobile terminal according to claim 7, wherein in the FCS mode, the mobile terminal receives fast cell selection information from the radio base station apparatus.

12. A radio communication method comprising the steps of:
generating communication environment information using a first downlink reference signal from a radio base station apparatus;
in a Fast Cell Selection (FCS) mode, receiving cell identification information for identifying a format of the first downlink reference signal; and
in the FCS mode, receiving downlink transmission data from the radio base station apparatus using a second downlink reference signal that is a terminal specific reference signal from the radio base station apparatus, based on the format of the first downlink reference signal identified by the cell identification information.

* * * * *